Nov. 3, 1959 R. B. EVANS ET AL 2,911,064
GAS FILTER APPARATUS WITH BAG AGITATOR
Filed Jan. 27, 1958

INVENTOR.
ROBERT B. EVANS
and ROBERT A. BUB
BY
Brown, Critchlow, Flick & Peckham
Their Attorneys

2,911,064

GAS FILTER APPARATUS WITH BAG AGITATOR

Robert B. Evans, Wilkinsburg, and Robert A. Bub, Penn Hills, Pa., assignors to Mine Safety Appliances Company, Pittsburgh, Pa., a corporation of Pennsylvania Application January 27, 1958, Serial No. 711,452

2 Claims. (Cl. 183—59)

This invention relates to gas filter apparatus, and more particularly to means for agitating filter bags to delay their clogging by the particulate matter they filter out of gas streams.

When a stream of gas flows into and through a filter bag, the particles that are filtered out by the bag are normally deposited on the inner surface of the bag. After a period of time the deposit becomes so complete that the gas has difficulty penetrating the bag. Shakers, rappers and other vibratory means can be installed to clean filter bars in place, but they are expensive to install, operate and service. Without them, it is necessary to remove a bag and shake out the material that it has collected before the bag can be used again. As this cleaning of the bag may be required fairly often, the frequent delays caused by it may be very objectionable.

It is among the objects of this invention to provide a gas filtering bag which is self-cleaning over an extended period of time, and which can be used much longer than heretofore without removal from operative position.

In accordance with this invention, a filter bag that has an open front for receiving a stream of gas to be filtered is provided inside with a flexible ribbon that extends substantially the full length of the bag. Adjacent the front end of the bag, provision is made for holding the front end of the ribbon near the axis of the bag. The opposite end of the ribbon may be left free or, if it is attached to the bag, enough slack is left in the ribbon for it to touch the side of the bag. When a turbulent stream of gas flows into the bag, it causes the ribbon to whip and beat against the side of the bag, thereby making it very difficult for particulate material to become deposited on the inside of the bag.

The preferred embodiment of the invention is illustrated in the accompanying drawings, in which—

Figure 1:
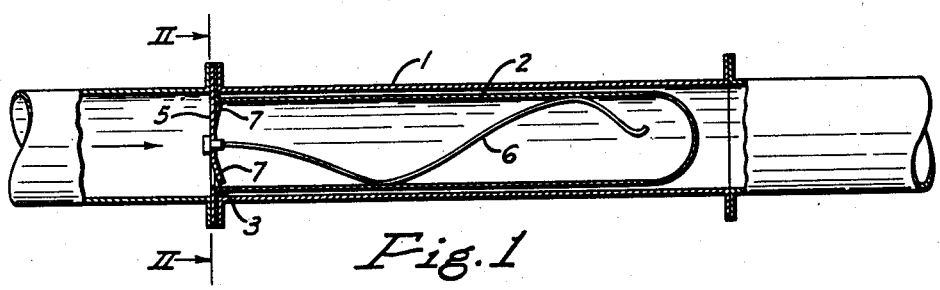
Fig. 1 is a longitudinal section through a filter bag containing a flexible ribbon.
Figure 2:
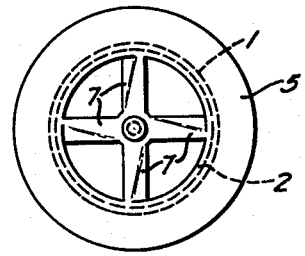
Fig. 2 is a view of the front end of the apparatus.

Referring to Figs. 1 and 2 of the drawings, a conduit for a gas stream has a section 1 in which a filter bag 2 is mounted. The bag is long in comparison with its diameter and may have a flange 3 at its open front end clamped between adjoining sections of the conduit. When there is no gas flow through the bag, it will collapse, but when gas is forced through the conduit it will enter the open end of the bag and inflate it as shown in Fig. 1. Of course, the expanded bag is smaller in diameter than the surrounding conduit so that there will be an open space in the conduit around the outside of the bag. If desired, several bags could be used in a common bag room, rather than in separate conduits.

The bag will filter particulate matter out of the gas stream flowing through it. This matter will tend to adhere to the inner surface of the bag and clog its pores. This is delayed as long as possible, in accordance with this invention, by providing means for beating or shaking the bag continually, whereby to reduce the rate of deposit on the bag and to shake deposited material loose. Accordingly, a cross member 5 is mounted in the conduit at the front end of the bag and has the front end of a flexible ribbon 6 attached to its center. The ribbon extends back through the bag for its full length. The ribbon may be made of any light-weight, highly flexible material, such as fabric for example. Assuming that the gas stream is turbulent, by which is meant that it is swirling, uneven or broken up into a non-laminar flow, the stream will cause the ribbon to whip around inside the bag and beat against its sides as indicated in Fig. 1. This wil shake and jar the bag sufficiently to make it difficult for the particulate material filtered out of the stream to stick to the bag, so material will fly about in the bag and not clog its porous surface.

In case this filter apparatus is being used with an even or laminar flow of gas that would not whip the ribbon around in the bag, the cross member 5 may be designed to break up the smooth flow and cause turbulence within the bag. For example, the cross member can be in the form of a spider provided with circumferentially inclined fins 7 that will impart a spinning motion to the gas stream as it enters the bag.

Figure 3:
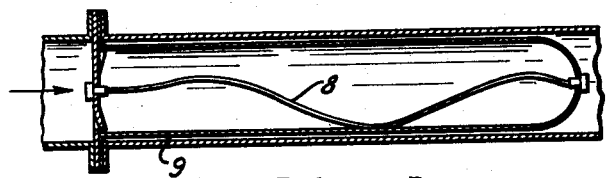
Fig. 3 is a longitudinal section of the modification.

In the modification shown in Fig. 3, the rear end of the ribbon 8 is attached to the rear end of the filter bag 9 in any suitable manner. It is therefore necessary to use a long ribbon that will have enough slack in it to permit at least its central portion to touch the side of the bag and beat against it when the gas stream whips the ribbon around in the bag.

With filter apparatus made in accordance with this invention, the build-up of particulate matter on the inside of the filter bag is delayed considerably so that the bag does not have to be removed and cleaned except at much longer intervals than heretofore when the bag was not self-cleaning. The bag shaker itself is simple and inexpensive and is operated entirely by the stream of gas being filtered.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Filter apparatus comprising a filter bag having an open front end for receiving a stream of gas to be filtered, a flexible ribbon inside the bag and extending lengthwise thereof, means adjacent the front end of the bag for holding the front end of the ribbon near the axis of the bag, and means connecting the rear end of the ribbon to the rear end of the bag with enough slack in the ribbon for it to touch the side of the bag whereby a turbulent stream of gas flowing into the bag will cause the ribbon to beat against the side of the bag and retard deposit of particulate matter thereon as said gas is filtered.

2. Filter apparatus comprising a filter bag having an open front end for receiving a stream of gas to be filtered, a flexible ribbon inside the bag and extending lengthwise thereof, and means adjacent the front end of the bag for holding the front end of the ribbon near the axis of the bag, said means being formed to direct the gas stream into the bag in a turbulent manner, whereby the ribbon will be caused to beat against the side of the bag and retard deposit of particulate matter thereon as said gas is filtered.

References Cited in the file of this patent

UNITED STATES PATENTS

| | | |
|---|---|---|
| 1,118,044 | Playter | Nov. 24, 1914 |
| 1,163,318 | Bryant | Dec. 7, 1915 |